United States Patent [19]

Tanaka et al.

[11] Patent Number: 4,909,586
[45] Date of Patent: Mar. 20, 1990

[54] TWO-WAY CONNECTOR

[75] Inventors: Toshiyasu Tanaka, Yokohama; Toshimi Nagaishi; Mituyoshi Suzuki, both of Machida, all of Japan

[73] Assignee: E. I. Du Pont De Nemours and Company, Wilmington, Del.

[21] Appl. No.: 295,506

[22] Filed: Jan. 11, 1989

[51] Int. Cl.[4] .............................................. G02B 6/32
[52] U.S. Cl. ................................ 350/96.18; 350/96.2; 350/96.15
[58] Field of Search ............... 350/96.18, 96.15, 96.16, 350/96.2

[56] References Cited

U.S. PATENT DOCUMENTS

| 4,021,099 | 5/1977 | Kawasaki et al. | 350/96.18 X |
| 4,634,215 | 1/1987 | Reule | 350/96.18 X |
| 4,717,229 | 1/1988 | Cutler | 350/96.15 |
| 4,718,055 | 1/1988 | Winzer | 350/96.18 X |
| 4,817,205 | 3/1989 | Asawa | 350/96.18 X |

OTHER PUBLICATIONS

Panock et al.; "An Experimental Low-Loss Single-Wavelength Bidirectional Light Wave Link", Journal of Light Wave Technology, vol. LT-2, No. 3, Jun. 1984, pp. 300-305.

*Primary Examiner*—John D. Lee
*Assistant Examiner*—John Ngo

[57] ABSTRACT

A two-way connector comprising a lens, light direction setting means for sending light from a light-transmitting member from one side to the other side of the lens as a light beam parallel to the optical axis, an optical fiber for light transmission and reception having a light transmitting and receiving end on a focal point on one side of the lens, an optical fiber for light reception having a light incoming end and a light outgoing end for conducting light gathered at a position deviated from the focal point of the lens on one side to a light receiving member, and a mirror disposed on the other side of the lens for receiving the light from the optical fiber via the lens and reflecting it to the incoming end of the light-receiving optical fiber via the lens.

3 Claims, 1 Drawing Sheet

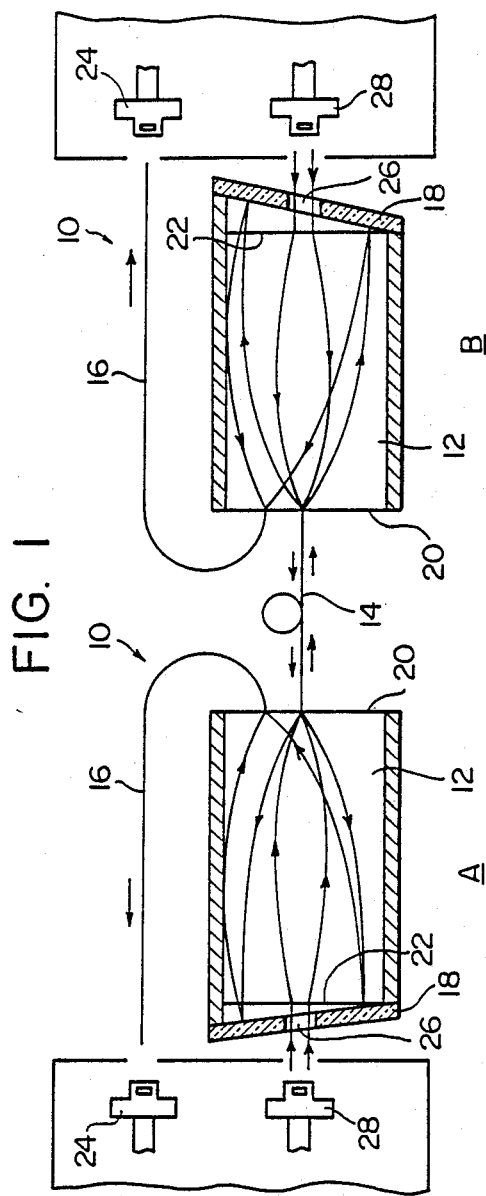
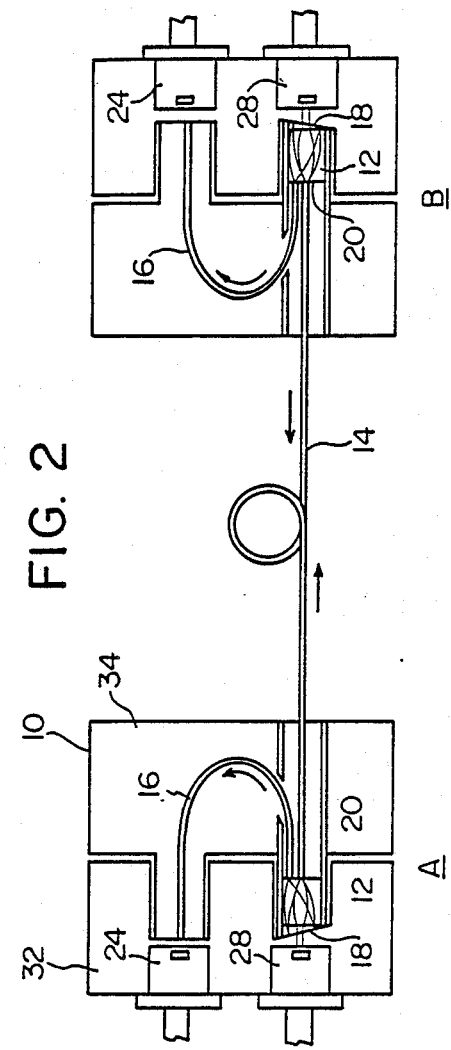
FIG. 1
FIG. 2

TWO-WAY CONNECTOR

BACKGROUND OF THE INVENTION

1. Field of the Invention

This invention relates to a two-way connector for use in an optical signal transmission system between stations.

2. Description of the Prior Art

In transmitting optical signals between two stations, an optical fiber for transmission and an optical fiber for reception have previously been used.

If the distance between the two stations is large, the use of one fiber instead of the two would greatly increase the economical advantage. Various devices for using one optical fiber for transmission and reception have been proposed from this viewpoint. If, however, one optical fiber is used concurrently for transmission and reception, optical signal interference occurs at the time of transmitting an optical signal for transmission to an end portion of the optical fiber and receiving an optical signal for reception at the end portion of the optical fiber. Furthermore, since in conventional devices, a light-transmitting member and a light-receiving member have to be disposed in proximity to each other, they electromagnetically affect each other, and the received signal interfers with the transmitted signal.

SUMMARY OF THE INVENTION

According to this invention, the above problems are solved by providing a two-way connector comprising
a lens,
light direction setting means for sending light from a light-transmitting member from one side to the other side of the lens as a light beam parallel to the optical axis,
an optical fiber for light transmission and reception having a light transmitting and receiving end on a focal point on one side of the lens,
an optical fiber for light reception having a light incoming end and a light outgoing end for conducting light gathered at a position deviated from the focal point of the lens on one side to a light receiving member, and
a mirror disposed on the other side of the lens for receiving the light from the optical fiber via the lens and reflecting it to the incoming end of the light-receiving optical fiber via the lens.

BRIEF DESCRIPTION OF THE DRAWINGS

FIG. 1 is a simplified view of a signal transmitting system between two stations which includes the two-way connector in accordance with one embodiment of the invention; and FIG. 2 is a view similar to FIG. 1 showing an embodiment in which the system is incorporated in a receptacle and a plug.

DETAILED DESCRIPTION OF THE PREFERRED EMBODIMENTS

With reference to FIG. 1, the illustrated system permits transmission of an optical signal between a first station A and a second station B.

Each of the first and second stations A and B is equipped with a two-way connector 10 in accordance with one embodiment of the invention. The connector 10 includes a rod lens 12, an optical fiber 14 for light transmission and reception, an optical fiber 16 for light reception, and a mirror 18 reflecting light from the light transmitting and receiving optical fiber 14 to the optical fiber 16 for light reception.

The rod lens 12 is a cylindrical lens and has such a property that when light falls perpendicularly (i.e., parallel to the optical axis) upon one end surface, this light is gathered at the center of the other end surface. A general convex lens and the like may be used instead of the rod lens 12. But the rod lens is preferred because, for example, it permits easy position alignment.

The optical fiber 14 for light transmission and reception is provided between the station A and the station B and transmits an optical signal between them. The end portion of the optical fiber 14 for light transmission and reception is positioned at the center (i.e., the focal point) of a first end surface 20 of the rod lens 12. One end portion of the light-receiving optical fiber 16 is positioned slightly out of the center of the first end surface 20 of the rod lens as will be mentioned below. The other end portion of the light-receiving optical fiber 16 is connected to the light receiving member 24.

The mirror 18 is disposed in the vicinity of and at a slight angle to, a second end surface 22 of the rod lens 12, and receives and reflects the light from the light transmitting and receiving optical fiber 14 via the rod lens 12 to gather the light at a position slightly away from the center of the first end surface 20 of the rod lens 12. One end portion of the light-receiving optical fiber 16 is located at this position slightly away from the center.

A bore 26 is formed in the center of the mirror 18 and the light from a light-emitting member 28 is sent perpendicularly to the second end surface 22 of the rod lens 12 via the bore 26. In the illustrated embodiment, the bore 26 provided in the center of the mirror 18 constitutes light direction setting means. The light direction setting means may be any means which performs the function of sending the light from the light-emitting member to the second end surface of the rod lens 12 as a perpendicular light beam, and may be constructed by using various known optical systems.

In this connector, the light from the light-emitting member 28 advances through the bore 26 formed in the mirror 18 and falls upon the second end surface 22 of the rod lens 12 as a perpendicular light beam. This light is gathered at the center of the first end surface 20 by the rod lens 12. Since the end portion of the light transmitting and receiving optical fiber 14 is disposed at this position, the light from the light-emitting member is sent to the optical fiber 14. The light receiving optical fiber 16 is positioned away from the center of the first end surface 20, and therefore, does not receive the light from the light-emitting member 28.

Since the light from the other station falls upon the center of the first end surface 20 of the rod lens 12 substantially as a dot light source, a light beam perpendicular to the second end surface 22 is emitted from the second end surface 22. This light beam collides with the mirror 18 and returns to the second end surface 22. Since the mirror 18 is disposed angularly to the second end surface 22, the light reflected at the mirror 18 and returned to the second end surface 22 collides with the second end surface 22 at an angle slightly deviated from the perpendicular. Accordingly, this light is gathered at a position away from the center of the first end surface 20 of the rod lens, comes into the light-receiving optical fiber 16 from its end portion disposed at this position, and is sent to the light-receiving member 24.

Most of the light beams from the light transmitting and receiving optical fiber 14 is reflected by the mirror 18, and slight beams of light advance through the bore 36 of the mirror 18. Beams of light from the optical fiber 14 which advance through the bore 26 and return through the bore 26 being reflected at various members are very small in amount if any. Accordingly, at this portion, too, the effect of the light from optical fiber 14 on the light transmitted to the optical fiber 14 can be ignored.

The light-receiving member 24 is connected to the rod lens 12 and the light-emitting member 28 by means of the light-receiving optical fiber 16. The positions of the light-receiving member 24 and the light-emitting member 28 can therefore be selected freely to some extent to prevent interference between them.

In a preferred embodiment shown in FIG. 2, the light-receiving member 24 and light-emitting member 28 are disposed in a receptable 32, and the rod lens 12, the light receiving optical fiber 16, the mirror 18, etc. are disposed in a plug 34. Thus, by connecting the receptacle and the plug, the end of the light-receiving member 24 and the end of the light-receiving fiber 16 can be properly positioned, and the light-emitting member 28 and the bore 26 of the mirror 18 are properly aligned.

According to the present invention, there can be provided a two-way connector which is substantially free from interference between a received signal and a transmitted signal, The invention can further provide a two-way connector in which the light-emitting member and the light-receiving member can be arranged in spaced-apart relationship.

We claim:

1. A two-way connector comprising
   a lens having an optical axis,
   light direction setting means for sending light from a light-transmitting member from one side to the other side of the lens as a light beam parallel to the optical axis,
   an optical fiber for light transmission and reception having a light transmitting and receiving end on a focal point on one side of the lens,
   an optical fiber for light reception having a light incoming and a light outgoing end for conducting light gathered at a position deviated from the focal point of the lens on one side to a light receiving member,
   a mirror disposed on the other side of the lens for receiving the light from the optical fiber for light transmission and reception via the lens and reflecting it to the incoming end of the light-receiving optical fiber via the lens, and
   the light direction setting means comprising a bore through the mirror.

2. The two-way connector of claim 1 in which the lens is a rod lens.

3. A two-way connector of claim 1 in which the bore is provided at the center of the mirror.

* * * * *